United States Patent
Chan et al.

(10) Patent No.: US 11,494,211 B2
(45) Date of Patent: Nov. 8, 2022

(54) DOMAIN IDENTIFIER AND DEVICE IDENTIFIER TRANSLATION BY AN INPUT-OUTPUT MEMORY MANAGEMENT UNIT

(71) Applicant: Advanced Micro Devices, Inc., Santa Clara, CA (US)

(72) Inventors: Maggie Chan, Toronto (CA); Philip Ng, Toronto (CA); Paul Blinzer, Bellevue, WA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 613 days.

(21) Appl. No.: 16/390,663

(22) Filed: Apr. 22, 2019

(65) Prior Publication Data
US 2020/0334058 A1    Oct. 22, 2020

(51) Int. Cl.
*G06F 9/455* (2018.01)
*G06F 12/1009* (2016.01)

(52) U.S. Cl.
CPC ...... *G06F 9/45545* (2013.01); *G06F 9/45558* (2013.01); *G06F 12/1009* (2013.01); *G06F 2009/45579* (2013.01); *G06F 2009/45583* (2013.01)

(58) Field of Classification Search
CPC ............. G06F 9/45545; G06F 9/45558; G06F 12/1009
See application file for complete search history.

(56) References Cited

U.S. PATENT DOCUMENTS

2018/0107608 A1* 4/2018 Kaplan ................. G06F 3/0659
2021/0064525 A1* 3/2021 Tian ...................... G06F 12/063

OTHER PUBLICATIONS

Advanced Micro Devices, Inc., AMD I/O Virtualization Technology (IOMMU) Specification, rev. 3.00, Dec. 2016.

* cited by examiner

*Primary Examiner* — Tammy E Lee
(74) *Attorney, Agent, or Firm* — Park, Vaughan, Fleming & Dowler LLP

(57) ABSTRACT

An electronic device includes a processor that executes a guest operating system and a hypervisor, an input-output (IO) device, and an input-output memory management unit (IOMMU). The IOMMU handles communications between the IOMMU and the guest operating system by: replacing, in communications received from the guest operating system, guest domain identifiers (domainIDs) with corresponding host domainIDs and/or guest device identifiers (deviceIDs) with corresponding host deviceIDs before further processing the communications; replacing, in communications received from the IO device, host deviceIDs with guest deviceIDs before providing the communications to the guest operating system; and placing, into communications generated in the IOMMU and destined for the guest operating system, guest domainIDs and/or guest deviceIDs before providing the communications to the guest operating system. The IOMMU handles the communications without intervention by the hypervisor.

24 Claims, 8 Drawing Sheets

DOMAIN IDENTIFIER AND DEVICE IDENTIFIER TRANSLATION BY AN INPUT-OUTPUT MEMORY MANAGEMENT UNIT

BACKGROUND

Related Art

Some electronic devices (e.g., server or desktop computers, etc.) support "virtualization" of electronic device hardware such as input-output (IO) devices, etc. Virtualization involves an intermediary entity on or in the electronic device providing, to instances of software executing on the electronic device (e.g., application programs, etc.), the illusion that the instances of software are able to access electronic device hardware directly, when, in reality, the intermediary entity intercepts/redirects or otherwise assists with accesses made by the instances of software. For example, one common intermediary entity is a "virtual machine." Virtual machines are software entities that abstract electronic device hardware and emulate or present a known interface to electronic device hardware, thereby enabling instances of software to execute on various types and arrangements of underlying electronic device hardware—possibly including electronic device hardware with which the instances of software would otherwise not be compatible. In some electronic devices, virtual machines provide support for executing one or more instances of operating systems, called "guest" operating systems. Guest operating systems in turn provide environments for executing other instances of software such as productivity applications, databases, etc.

In some electronic devices, virtual machines are managed and controlled by a software entity known as a hypervisor. Hypervisors may start or initialize virtual machines; control, monitor, and assist with accesses of electronic device hardware by virtual machines; terminate or close virtual machines; etc. FIG. 1 presents a block diagram illustrating virtual machines and a hypervisor. As can be seen in FIG. 1, there are three virtual machines (VM) 100, under each of which executes a guest operating system (GUEST OS) 102 and one or more programs (PRGRMS) 104, such as databases, software applications, etc. Virtual machines 100 communicate with hypervisor 106, which interfaces between a host operating system (HOST OS) 108 and virtual machines 100. Host operating system 108 provides an interface between electronic device hardware 114 and hypervisor 106. In addition, hypervisor 106 interfaces between input-output management unit (IOMMU) 112, which serves as a memory management unit and controller for IO device hardware 114, and virtual machines 100.

Among the operations performed by hypervisors is the handling of communications between electronic device hardware and guest operating systems (or, more broadly, virtual machines). For example, a hypervisor may translate, redirect, or otherwise assist with communications between guest operating systems and an input-output management unit (IOMMU). The communications handled by the hypervisor include communications such as peripheral page request (PPR) log and event log writes by the IOMMU and command buffer writes by the guest operating systems. PPR log, event log, and command buffer writes are described in detail in the AMD I/O Virtualization Technology (IOMMU) Specification, rev. 3.00, December 2016, which is incorporated by reference herein in its entirety.

FIG. 2 presents a block diagram illustrating communications between a guest operating system and an IOMMU that are handled by the hypervisor. In FIG. 2, a number of elements are shown dotted/stippled; these elements are logs, buffers, etc. that are stored in a memory (e.g., a main memory for the electronic device) and thus accessed via typical memory access techniques. The elements in FIG. 2, along with guest operating system 102, hypervisor 106, and IOMMU 112, include guest peripheral page request (PPR) log 200, guest command buffer (CMD BUF) 202, and guest event log 204, which are structures (e.g., lists, tables, etc.) in memory that are used for storing communications from and destined for guest operating system 102. In addition, the elements include guest pointers (PTRS)/status registers (REGS) 206, which are a set of locations in memory for storing pointers to guest operating system structures and status information associated with the guest operating system. The elements further include IOMMU peripheral page request log 208, IOMMU command buffer 210, and IOMMU event log 212, which are structures (e.g., lists, tables, etc.) in memory that are used for storing communications from and destined for IOMMU 112. The elements also include IOMMU memory mapped input-output (MMIO) pointers/status registers (REGS) 214 in IOMMU 112, which are a set of registers in IOMMU 112 for storing pointers to various IOMMU 112 structures and status information associated with the IOMMU 112.

In operation, and using a command as an example, guest operating system 102 writes a command destined for IOMMU 112 to guest command buffer 202 (i.e., to a next available location in the buffer in memory where commands from guest operating system 102 are stored). Because guest operating system 102 uses a "guest" domain identifier (domainID) and/or device identifier (deviceID) in the command that is different than the "host" domainID and/or deviceID that is used by IOMMU 112, IOMMU 112 will be unlikely to identify the correct device and/or domain (domainIDs and deviceIDs are described elsewhere herein, but generally identify particular devices from among a set of devices in the electronic device or identify a protection domain, which is a mechanism for grouping devices for performing memory accesses). Using the commands without translating or converting the guest domainID and/or deviceID may thus cause the commands to be improperly handled by IOMMU 112, which can lead to errors in the electronic device. Hypervisor 106 therefore, as shown via a dotted line in FIG. 2, intercepts the guest operating system's write to guest command buffer 202, looks up, in a hypervisor data structure, the mapping from guest domainID and/or guest domainID to host domainID and/or deviceID, replaces the guest domainID and/or guest deviceID in the command with the corresponding host domainID and/or deviceID, and stores the updated command in IOMMU command buffer 210. IOMMU 112 then retrieves the command from IOMMU command buffer 210 and executes the command, which causes IOMMU 112 to perform a corresponding action. Hypervisor 106 performs at least some similar operations for IOMMU 112 writes to IOMMU peripheral page request log 208 and to IOMMU event log 212 (although replacing host deviceIDs with guest deviceIDs, etc.), accesses of guest pointers/status registers 206, and accesses of IOMMU MMIO pointers/status registers 214. Because the memory reads and writes, the lookup of the mapping, and the other operations performed by hypervisor 106 are longer latency, using hypervisor 106 to intervene between guest operating system 102 and IOMMU 112 leads to delay in processing communications, as well as causing the processor to be busy and adding traffic on a memory bus in the electronic device.

BRIEF DESCRIPTION OF THE FIGURES

Throughout the figures and the description, like reference numerals refer to the same figure elements.

DETAILED DESCRIPTION

Figure 1:
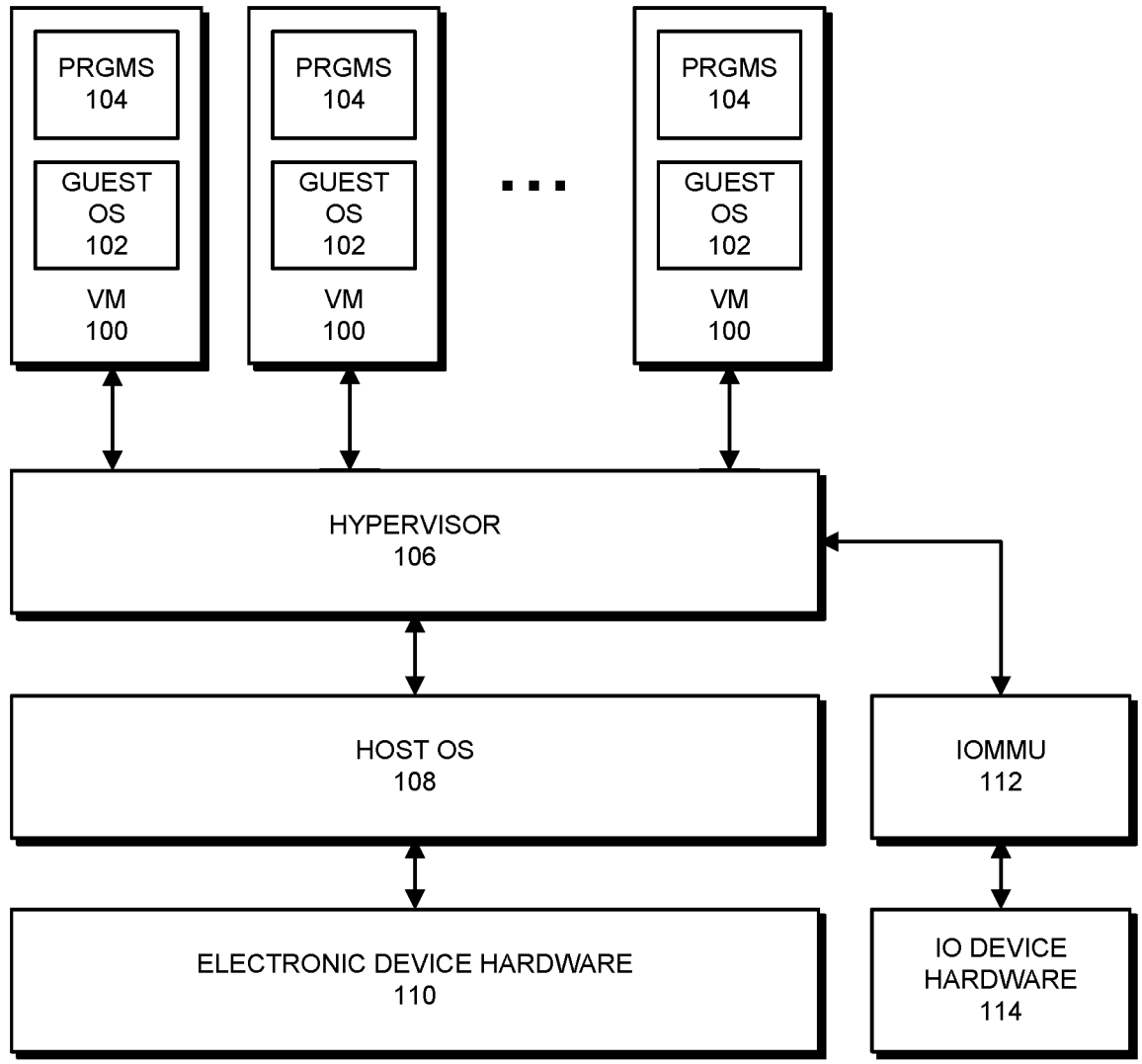
FIG. 1 presents a block diagram illustrating virtual machines and a hypervisor.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Virtualization, Virtual Machines, and Hypervisors

The described embodiments support "virtualization" of electronic device hardware such as memories, input-output (IO) devices, etc. Virtualization generally involves an intermediary entity on or in the electronic device providing, to instances of software executing on the electronic device, the illusion that the instances of software are able to access electronic device hardware directly, when, in reality, the intermediary entity intercepts/redirects, translates, or otherwise assists with accesses made by the instances of software. For example, an instance of software may be presented, by an intermediary entity, with a set of electronic device registers, memory locations, electronic device settings, and other functional blocks that appear to the instance of software to be actual device registers, memory locations, etc. of an electronic device, but instead are merely copies that are presented by the intermediary entity. In this case, the intermediary entity receives, intercepts, or otherwise acquires accesses of the copies of electronic device hardware and makes corresponding interactions with actual electronic device hardware on behalf of the instance of software. The virtualization of electronic device hardware has a number of benefits, such as enabling different electronic devices to use different arrangements of electronic device hardware, different addresses, locations, or identifiers for electronic device hardware, etc., while instances of software are presented, via the intermediary entities, with the same interfaces to electronic device hardware. In addition, intermediary entities may determine whether to allow or block accesses of electronic device hardware by given instances of software, and thus virtualization of electronic device hardware enables protection of electronic device hardware (or portions thereof) and/or instances of software executing on the electronic devices. By controlling access as described, the intermediary entities may share electronic device hardware between a number of instances of software and/or provide exclusive access to portions of electronic device hardware to individual instances of software.

In the described embodiments, the intermediary entities include "virtual machines." Virtual machines are software entities that abstract electronic device hardware and present, to instances of software, a known interface to actual or emulated electronic device hardware. Abstracting the hardware enables the instances of software to execute on various types and arrangements of underlying electronic device hardware—possibly including electronic device hardware with which the instances of software would otherwise not be compatible. In the described embodiments, virtual machines provide support for executing one or more instances of operating systems, called "guest" operating systems. Guest operating systems in turn provide environments for executing other software programs such as applications, databases, etc.

Figure 3:
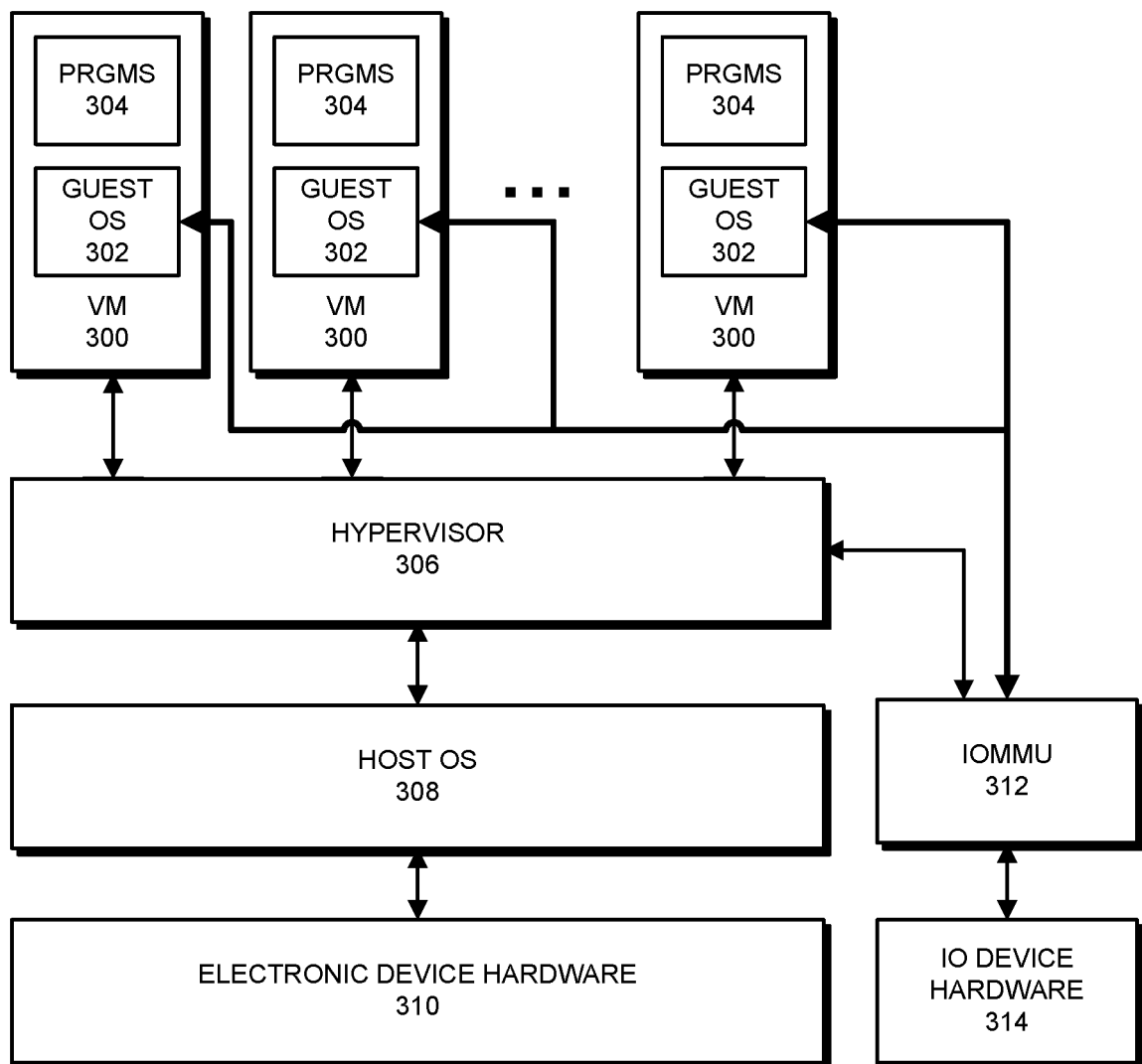
FIG. 3 presents a block diagram illustrating virtual machines and a hypervisor in accordance with some embodiments.

In the described embodiments, virtual machines are managed and controlled by a software entity known as a hypervisor. Hypervisors may start or initialize virtual machines; control, monitor, and assist with accesses of electronic device hardware by virtual machines; terminate or close virtual machines; etc. FIG. 3 presents a block diagram illustrating virtual machines and a hypervisor in accordance with some embodiments. As can be seen in FIG. 3, there are three virtual machines (VM) 300, under each of which executes a guest operating system (GUEST OS) 302 and one or more programs (PRGRMS) 304, such as databases, software applications, etc. Virtual machines 300 communicate with hypervisor 306, which interfaces between a host operating system (HOST OS) 308 and virtual machines 300. Host operating system 308 provides an interface between electronic device hardware 310 and hypervisor 306. Differently than what is shown in FIG. 1 for existing electronic devices, in FIG. 3, IOMMU 312 interfaces directly between guest operating systems 302 and IO device hardware 314, without hypervisor 306 intervening (as shown by the heavier line between IOMMU 312 and guest operating systems 302). Unlike in existing electronic devices, therefore, in the described embodiments, hypervisor 306 is not responsible for performing at least some of the operations for handling communications between guest operating systems 302 and IOMMU 312, as described herein. Note, however, that certain communications occur between IOMMU 312 and hypervisor 306, as shown by the line between hypervisor 306 and IOMMU 312. In addition, note that, in some cases, host operating system 308 is not present and hypervisor 306 communicates more directly with electronic device hardware 310.

Domain Identifiers and Device Identifiers

In the described embodiments, an electronic device uses domain identifiers (domainIDs) and device identifiers (deviceIDs) for identifying input-output (IO) devices for operations such as page table walks, interrupt remapping, device accesses, event reporting, etc. For example, an input-output memory management unit (IOMMU) in the electronic device can use domainIDs and/or deviceIDs for determining sources or destinations of communications between a processor (or software executing thereon) and IO devices, for determining page tables to be used for address translations for IO devices, for reporting, to a processor, events triggered by or occurring at particular IO devices, etc. A domainID is a numerical value that identifies a protection domain to which an IO device belongs. One or more IO devices can belong to a given protection domain, and the IO devices included in each protection domain may have the same set of address mappings (i.e., use the same page table(s)) and access rights for pages in memory. A deviceID is a numerical identifier that includes or is generated based on information such as a bus identifier that identifies an interface bus on which an IO device is located, a device number that identifies the IO device among a number of devices in the electronic device, and a function number that identifies the function performed by the IO device. DomainIDs and deviceIDs are described in more detail in the AMD I/O Virtualization Technology (IOMMU) Specification, rev. 3.00, December 2016, which, as described above, is incorporated by reference herein.

In some embodiments, one effect of the above-described virtualization is that guest operating systems and electronic device hardware such as the IOMMU or IO devices can use different values for domainIDs and/or deviceIDs. In these embodiments, guest operating systems can use "local" or "guest" values for the domainIDs and/or deviceIDs that are selected by, determined by, or programmed in to the guest operating system, and the electronic device hardware can use "system" or "host" values for the domainIDs and/or deviceIDs that are selected by, determined by, or programmed in to the electronic device hardware. Because the values for domainIDs and deviceIDs are different, communicating between the guest operating systems and the electronic device hardware involves one or more entities handling the communications (i.e., translating and/or otherwise assisting with the communications). Differently than in existing systems, in the described embodiments, a hypervisor does not translate and/or otherwise assist with the communications. Instead, and as described herein, the IOMMU includes mechanisms for translating and/or otherwise assisting with the communications without intervention by the hypervisor. In some embodiments, although the hypervisor is not involved with the translating and/or assisting with communications, the hypervisor can help to set up or configure the IOMMU for handling the communications.

Overview

In the described embodiments, an electronic device includes a processor, a memory, and a number of input-output (IO) devices (e.g., a network interface device, a disk controller, etc.). The electronic device also includes an input-output memory management unit (IOMMU) that interfaces between the processor and the IO devices. The processor in the electronic device executes a hypervisor, one or more virtual machines, and, in the virtual machines, guest operating systems. The IOMMU performs operations for handling communications between guest operating systems and the IOMMU and IO devices. More specifically, the IOMMU translates guest domainIDs and guest deviceIDs in communications from the guest operating systems to host domainIDs and host deviceIDs before the communications are processed in the IOMMU and/or the IO devices. In addition, the IOMMU translates host domainIDs and/or host deviceIDs in communications from the IO devices to guest domainIDs and/or guest deviceIDs, and generates communications that include guest domainIDs and/or guest deviceIDs, before sending the communications to the guest operating system for processing.

The above-described communications processed by the IOMMU include various forms/types of communication between the guest operating system and the IOMMU and IO devices. Generally, the IOMMU in the described embodiments can perform translations or conversions of domainIDs and/or deviceIDs in any communications between the guest operating system and the IOMMU and IO devices. As an example of communications from the guest operating systems to the IOMMU, in some embodiments, guest operating systems write commands into a command buffer provided by the IOMMU. The IOMMU, while processing commands from the command buffer, acquires guest domainIDs and/or deviceIDs from the commands and uses an ID translation table to look up corresponding host domainIDs and/or deviceIDs. The IOMMU then replaces the guest domainIDs and/or deviceIDs with the host domainIDs and/or deviceIDs before further processing the commands. As an example of communications from the IOMMU to a guest operating system, in some embodiments, the IOMMU writes peripheral page requests (PPRs) to a page request interrupt log for the guest operating system. Before writing the PPRs to the log, the IOMMU acquires host deviceIDs from the PPRs (or determines the host deviceID based on source IO devices) and uses device table entries for the source IO devices to look up associated guest deviceIDs. The IOMMU then replaces the host deviceIDs with the guest deviceIDs before storing the PPRs in the peripheral page request log for the guest operating system. As another example of communications from the IOMMU to the guest operating systems, in some embodiments, when generating communications (e.g., about events, etc.) destined for guest operating systems, the IOMMU uses the ID translation table and/or the device table to determine guest domainIDs and/or deviceIDs to be included in the communications—and thus does not include host domainIDs and/or deviceIDs in communications generated by the IOMMU.

In some embodiments, the above-described ID translation table and/or device table are populated/configured and/or updated by the hypervisor or another software or hardware entity (e.g., an operating system, etc.) to include information to be used by the IOMMU for processing communications. For example, in some embodiments, the hypervisor communicates, to the IOMMU, the mappings between guest domainIDs and/or deviceIDs and host domainIDs and/or deviceIDs, and the IOMMU writes the mappings to the ID translation table. In these embodiments, the IOMMU includes or provides one or more memory-mapped input-output (MMIO) registers (or corresponding memory locations in the memory) to which each mapping is written in sequence, until the IOMMU has received and stored all mappings from the hypervisor.

In some embodiments, the IOMMU does not internally store at least a portion of the ID translation table and/or the device mapping table. In these embodiments, the IOMMU stores some or all of the ID translation table and/or the device table to a memory (e.g., a main memory) or another backing store. In these embodiments, the IOMMU includes one or more private memory translation tables or lists in which are stored the location of the ID translation table (e.g., base address, length, etc.) and/or device table in the memory or backing store.

By handling communications between guest operating systems and the IOMMU as described above, the IOMMU performs operations that are performed by the hypervisor in existing devices. Removing the operation from the hypervisor, which is implemented in software, to the IOMMU, which is implemented in hardware, enables the operations to be performed with less delay and reduced processor operations, which can help to improve the performance of the IOMMU and the processor. This can, in turn, help to improve the performance of the electronic device, leading to higher user satisfaction.

Electronic Device

Figure 4:
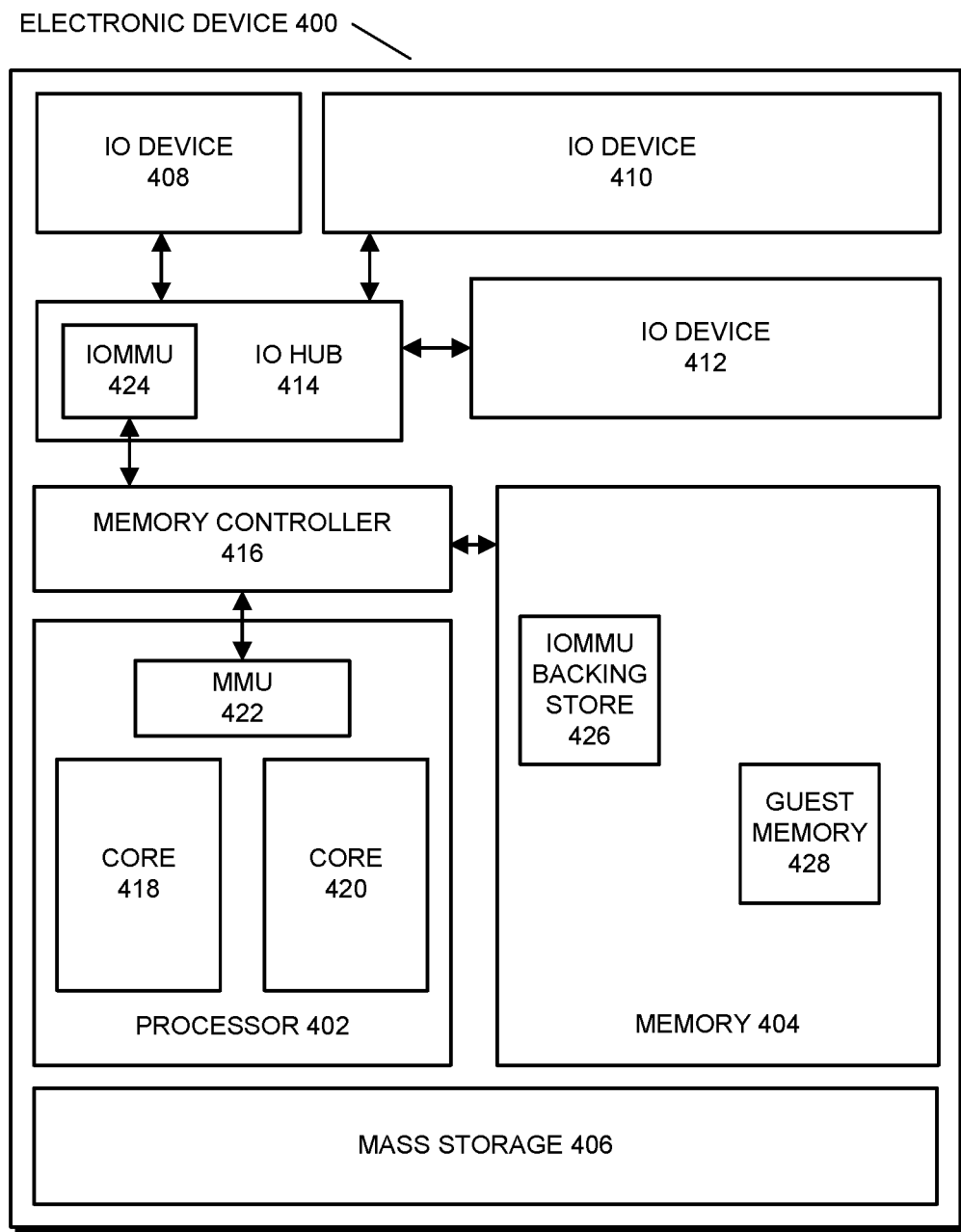
FIG. 4 presents a block diagram illustrating an electronic device in accordance with some embodiments.

FIG. 4 presents a block diagram illustrating electronic device 400 in accordance with some embodiments. As can be seen in FIG. 4, electronic device 400 includes processor 402, memory 404, mass storage 406, input-output (IO) devices 408-412, input-output (IO) hub 414, and memory controller 416.

Processor 402 is a functional block that performs computational operations in electronic device 400. Processor 402 includes two cores 418-420, each of which includes one or more computational mechanisms such as central processing unit (CPU) cores, graphics processing unit (GPU) cores, embedded processors, application specific integrated circuits (ASICs), and/or other computational mechanisms. Processor 402 also includes memory management unit (MMU) 422, which is a functional block that performs operations associated with address translations (e.g., page table walks, translation lookaside buffer lookups, etc.), memory access protections, etc. for memory accesses by cores 418-420.

Memory 404 is a functional block that performs operations of a memory in electronic device 400 (e.g., a "main" memory). Memory 404 includes memory circuits such as one or more of dynamic random access memory (DRAM), double data rate synchronous DRAM (DDR SDRAM), and/or other types of memory circuits for storing data and instructions for use by other functional blocks in electronic device 400, as well as control circuits for handling accesses (e.g., reads, writes, checks, deletes, invalidates, etc.) of the data and instructions that are stored in the memory circuits.

Mass storage 406 is a functional block and/or device that performs operations of a high-capacity non-volatile storage element for storing data and instructions for use by other functional blocks in electronic device 400. Mass storage 406 can be or include a high-capacity semiconductor memory (e.g., flash memory, etc.), a disk drive (hard drive, etc.), an optical drive, etc. Copies of the data and instructions stored in mass storage 406 are acquired and stored in memory 404 for use by other functional blocks in electronic device 400. For example, in some embodiments, data and/or instructions are retrieved from mass storage 406 in blocks or "pages" of a given size (e.g., 4 kB, 2 MB, etc.) and the pages are stored in memory 404 for accesses by the other functional blocks. In addition, pages may be newly created at an available location in memory 404 (e.g., for storing computational results, etc.).

IO devices 408-412 are functional blocks and/or devices that perform corresponding IO operations. The particular nature of the IO operations performed by each of IO devices 408-412 depend on the nature of the IO device. For example, IO devices 408-412 may include human interface devices, network interface devices, audio/visual processing or providing devices, GPUs, sensor devices, disk controllers, peripheral component interface (PCI) devices, universal serial bus (USB) devices, etc., and each IO device performs associated operations, such as receiving input from a human (e.g., keyboard, mouse, etc.), receiving or sending data on a network, etc. IO devices 408-412 provide data and/or instructions to, or consume data and/or instructions from, other functional blocks in electronic device 400. For example, in some embodiments, IO devices 408-412 access (i.e., read, write, invalidate, etc.) data in pages of memory in memory 404 that are private to guest operating systems.

IO hub 414 is a functional block that performs operations of an input-output hub that interfaces between IO devices 408-412 and other functional blocks in electronic device 400 (e.g., processor 402, memory 404, etc.). The operations performed by IO hub 414 include operations for ensuring that communications destined for IO devices 408-412 reach the intended IO device, that communications from IO devices 408-412 properly reach other functional blocks, that the other functional blocks are kept secure from impermissible accesses by IO devices 408-412 and vice versa, etc. In some embodiments, IO hub 414 interfaces, and thus converts or translates associated communications, between buses that use different communication standards, such as between a peripheral component interface express (PCIe) bus and a HyperTransport Link®, etc.

IO hub 414 includes IOMMU 424, which is a functional block that performs operations for enabling IO devices 408-412 to access data and/or instructions in memory 404, communicates with processor 402, etc. In these embodiments, when data and instructions are to be accessed by an IO device (e.g., IO device 408) in memory 404, the IO device sends a memory access request (e.g., a direct memory access request or DMA) to IOMMU 424. IOMMU 424 then sends a corresponding request to memory 404 for satisfaction of the memory access request. For example, in some embodiments, if data is to be retrieved based on the memory access request, IOMMU 424 acquires the data from memory 404 (or mass storage 406, should the data not be present in memory 404) and forwards the data to the requesting IO device. In some embodiments, IOMMU 424 includes page tables, translation lookaside buffers, and/or other functional blocks that are used for translating "virtual," or local, memory addresses used by IO devices 408-412 into physical addresses in memory 404 where data is actually located.

In the described embodiments, IOMMU 424 communicates with guest operating systems executed by cores 418-420 in virtual machines and vice versa. For example, in some embodiments, IOMMU 424 (or IO devices 408-412 via IOMMU 424) communicates events and peripheral page requests (PPRs) to guest operating systems. In these embodiments, IOMMU 424 reports, to guest operating systems, events such as illegal device table entries, IO page faults (for page table walks on behalf of IO devices 408-412), IOMMU 424 hardware errors, etc., via shared guest event logs in memory 404. In addition, in these embodiments, IOMMU 424 forwards, to guest operating systems, PPRs from peripherals (IO devices) that are configured to use the well-known address translation service or ATS standard for memory page servicing operations (i.e., for performing operations on or associated with pages in memory 404 that are accessible by the guest operating system) via shared guest PPR logs in memory 404. As another example, in some embodiments, guest operating systems communicate commands to IOMMU 424. In these embodiments, guest operating systems issue commands to the IOMMU 424 to control the IOMMU 424 and/or IO devices 408-412 such as completion wait (which serves as a command barrier that forces earlier commands to complete before the IOMMU 424 proceeds), device table entry invalidations, IOMMU 424 translation lookaside buffer entry invalidations, etc. via shared guest command buffers in memory 404. As described herein, IOMMU 424 translates guest domainIDs and/or deviceIDs in communications to host domainIDs and/or deviceIDs and vice versa.

In some embodiments, IOMMU 424 provides an interface to guest operating systems, the interface including memory-mapped locations, registers, etc. that are used for communicating with IOMMU 424. For example, in some embodiments, IOMMU 424 provides a set of memory mapped input-output (MMIO) memory locations to which guest operating systems can write values so that the values will be received by IOMMU 424. In some embodiments, the interface is virtualized, in that the memory locations, registers, etc. are not, as assumed by the guest operating system, used for storing the values, but instead are simply presented as being used by IOMMU 424. In these embodiments, IOMMU 424 may receive values via the interface from guest operating systems, but uses backing store 426 and/or other locations in memory 404 for storing separate copies of the values in the memory locations, registers, etc. for each guest operating system. The memory accessed by IOMMU 424 for communicating with guest operating systems and other entities (e.g., processor 402, etc.) is described in more detail below.

Guest memory 428 is a portion of memory 404 (e.g., one or more pages of memory) that is used by a corresponding guest operating system (e.g., a guest operating system 302) for storing data and information to be used by the guest operating system. Generally, guest memory 428 can be used by the guest operating system to store any form of data and information used by the guest operating system and/or other entities. In some embodiments, guest memory 428 is protected, so that only certain entities are allowed to access guest memory 428. In some embodiments, guest memory 428 is used for storing structures such as guest event logs, guest peripheral page request (PPR) logs, and guest command buffers, which are data structures (e.g., tables, lists, etc.) that are used for communicating between the guest operating system and the IOMMU. Guest event logs, guest peripheral page request (PPR) logs, and guest command buffers are described in more detail below.

In some embodiments, communication paths are coupled between the various functional blocks in electronic device 400 (processor 402, memory controller 416, memory 404, etc.), as shown by arrow-headed lines between the elements. Communication paths include one or more buses, wires, guides, and/or other connections possibly along with controllers, fabric elements (switches, routers, etc.), circuit elements, etc. The communication paths are used to route commands, data, control signals, and/or other information between the functional blocks. For example, in some embodiments, a coherent bus fabric or interconnect is coupled between IO hub 414, processor 402 (e.g., MMU 422), and memory 404. Note that some communication paths in electronic device 400 are not shown in FIG. 4 for clarity.

In some embodiments, electronic device hardware 310 in FIG. 3 includes functional blocks and devices such as processor 402 and memory 404, and IO device hardware 314 includes functional blocks and devices such as IO devices 408-412. In these embodiments, IOMMU 312 in FIG. 3 and IOMMU 424 in FIG. 4 perform the same operations.

Electronic device 400 is shown using a particular number and arrangement of elements (e.g., functional blocks and devices such as processor 402, memory 404, etc.) and communication paths. Electronic device 400, however, is simplified for illustrative purposes, in some embodiments, a different number or arrangement of elements and/or communication paths is present in electronic device 400. For example, electronic device 400 can include power subsystems, displays, etc. Generally, electronic device 400 includes sufficient elements and communication paths to perform the operations herein described.

Electronic device 400 can be, or can be included in, any electronic device that performs computational operations. For example, electronic device 400 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Portions of Memory Accessed by the IOMMU

Figure 5:
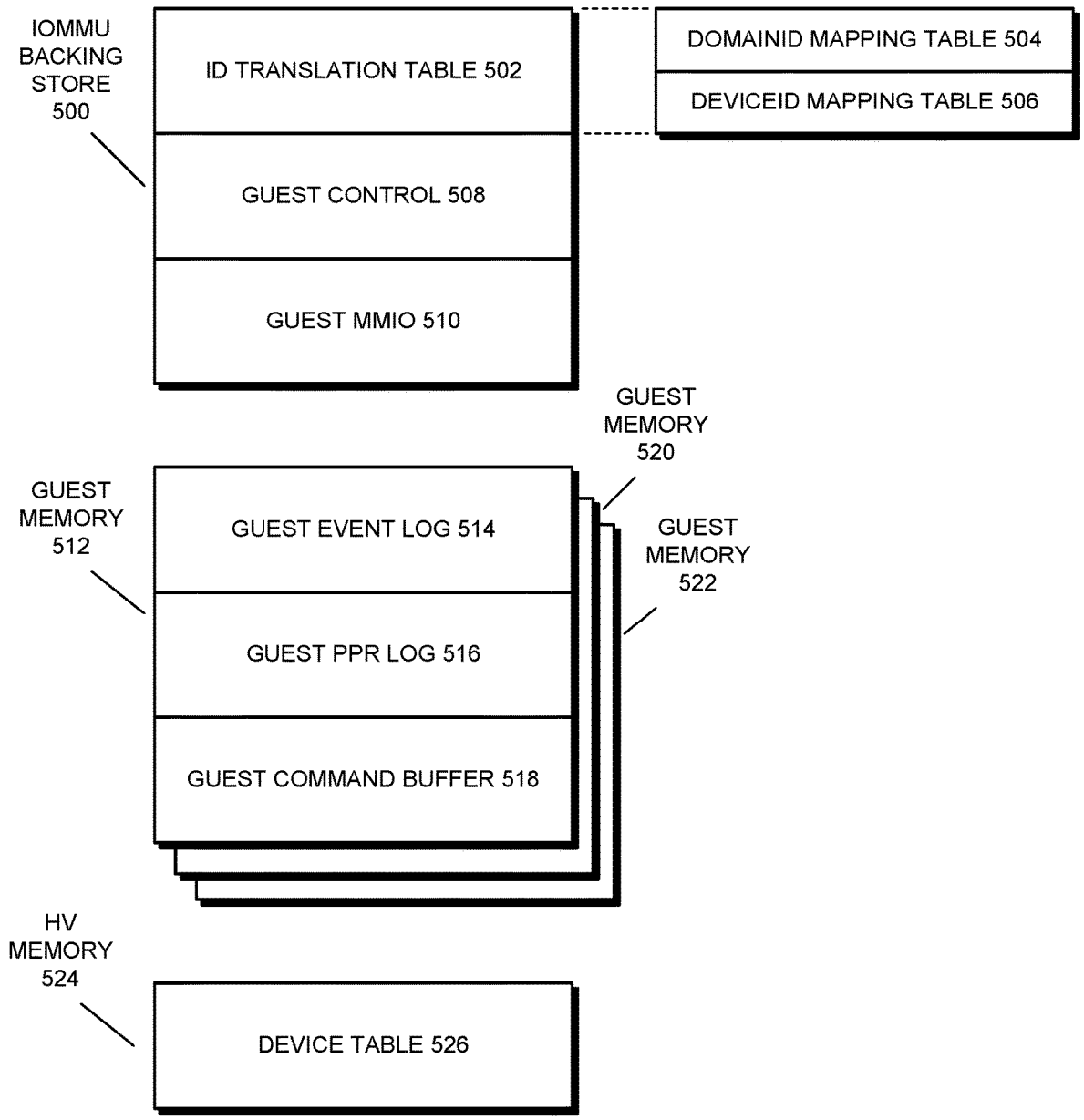
FIG. 5 presents a block diagram illustrating portions of memory accessed by the IOMMU in accordance with some embodiments.

In some embodiments, the IOMMU accesses data and information in different portions of memory (e.g., memory 404) in order to perform the operations herein described. In some of these embodiments, the portions of memory include an IOMMU backing store (e.g., IOMMU backing store 426), a guest memory (e.g., guest memory 428), and/or a hypervisor memory. FIG. 5 presents a block diagram illustrating portions of memory accessed by the IOMMU in accordance with some embodiments. Although FIG. 5 is presented as an example, in some embodiments, the memory and/or different portions of the memory store different types and/or arrangements of information. Generally, the memory includes sufficient information to enable the operations herein described.

As can be seen in FIG. 5, IOMMU backing store 500 includes ID translation table 502. Generally, ID translation table 502 includes information that is used by the IOMMU for translating or converting guest domainIDs and/or deviceIDs in communications from guest operating systems to the IOMMU to host domainID and/or deviceIDs—or the reverse, for communications from the IOMMU to the guest operating systems. In some embodiments, ID translation table 502 includes separate tables for domainIDs, shown as domainID mapping table 504, and deviceIDs, shown as deviceID mapping table 506, although separate tables are not required (and thus all of the translations may be included in a single table). DomainID mapping table 504 includes a set of entries, each entry used for storing an identification or indication of a guest domainID that is associated with or related to a specified host domainID. DeviceID mapping table 506 includes a set of entries, each entry used for storing an identification or indication of a guest deviceID that is associated with or related to a specified host deviceID. In operation, when a guest or host domainID and/or deviceID is to be translated or converted in a communication, the IOMMU performs a lookup in ID translation table 502 (i.e., domainID mapping table 504 and/or deviceID mapping table 506) to acquire the corresponding translation or conversion.

IOMMU backing store 500 also includes guest control 508. Generally, guest control 508 includes copies of values stored in or from interface registers and control registers for guest operating systems in the electronic device. Guest control 508 includes, for each supported guest operating system, a copy of guest interface registers and/or guest operating system control registers (or at least the values therein) that control interactions between the IOMMU and that guest operating system. For example, guest control 508 may include, for each guest operating system, map control registers that are used for communicating domainID and/or deviceID mappings for the guest operating system to the IOMMU. As another example, guest control 508 may include, for each guest operating system, command control registers, event control registers, and PPR control registers that dictate how that guest is to interact with the command buffer, the event log, and the PPR log, and/or how that guest is otherwise configured.

IOMMU backing store 500 also includes guest memory mapped input-output (MMIO) 510. Generally, guest MMIO 510 includes pointer and control information used for accessing buffers and logs (e.g., guest command buffers, guest event logs, and guest PPR logs) for guest operating systems in guest portions of memory 404 (e.g., guest memory 428). More specifically, guest MMIO 510 includes, for each supported guest operating system, a separate copy of values that are used for making/controlling accesses of buffers and logs in the guest portions of memory 404. For example, in some embodiments, the IOMMU supports (can interact with, process communications for, etc.) $2^N$ guest operating systems, where N=10, 16, or another value, and thus guest MMIO 510 includes up to $2^N$ copies of the values, one for each supported guest operating system. In the described embodiments, the values that are used for controlling accesses are similar to the values stored in IOMMU MMIO registers in existing devices, although a separate set of the values is kept for each supported guest operating system—and refers to that guest operating system's guest portion of memory 404 (and not the single copy in the IOMMU in existing devices). For example, in some embodiments, guest MMIO 510 includes, for each supported guest operating system, command, event, and PPR head and/or tail pointers indicating locations of the guest command buffer, guest event log, and guest PPR log in the corresponding guest portion of the memory, as well as control registers in which the bits control or identify that guest operating system's capabilities and configurations for commands, events, and PPRs.

Guest memory 512 includes guest event log 514, guest peripheral page request (PPR) log 516, and guest command buffer 518 for a guest operating system. Generally, guest event log 514, guest peripheral page request log 516, and guest command buffer 518 are memory structures (e.g., lists, tables, buffers, etc.) that are used for storing corresponding events, PPR requests, and commands for access by the IOMMU and/or the guest operating system. In operation, the IOMMU communicates, to the guest operating system, events and PPRs via the corresponding log in guest event logs 514 and guest PPR logs 516 in guest memory 512. In addition, the guest operating system communicates, to the IOMMU, commands via the corresponding command buffer in guest command buffers 518 in guest memory 512. In some embodiments, each guest operating system active in electronic device 400 is associated with a corresponding separate guest memory (i.e., a number of pages in memory 404) that includes a guest event log, a peripheral page request log, and a guest command buffer used by that guest operating system and accessible by the IOMMU. This is shown in FIG. 5 as additional guest memories 520-522 behind guest memory 512.

Hypervisor memory 524 includes device table 526. Generally, device table 526 is a table in which device-related information is stored for devices (which can be actual/physical devices or virtual devices) in, associated with, and/or coupled to the electronic device. Device table 526 includes a set of entries, each entry useable to store information about a corresponding device, such as pointers to page tables and interrupt tables, control and configuration values, capability indicators, mode indicators, domainID, security information and settings, etc. In addition, in the described embodiments—and differently than in existing device tables—each entry in device table 526 includes deviceID and a guest identifier for a guest operating system in communication with, responsible for, or otherwise associated with the device. In operation, in addition to using the device table for determining information about devices, the IOMMU uses the deviceIDs and/or guest identifiers for translating or converting guest deviceIDs to host deviceIDs.

In some embodiments, some or all of the IOMMU backing store 500, guest memory 512, and hypervisor memory 524 and/or portions thereof are not contiguous, but instead are stored in different areas or locations of memory. For example, a base address of the guest event log 514 (and thus the guest event log itself) may be located remote in memory from the guest PPR log 516. Guest event log 514 may not, therefore, neighbor guest PPR log 516 as shown in FIG. 5.

In some embodiments, the IOMMU includes a private address map that includes pointers to, references, and/or other indications of the locations in memory of the various data and information in the memory to be accessed by the IOMMU. For example, the IOMMU private address map may include pointers to the base addresses in memory for guest event log 514, guest PPR log 516, etc. In these embodiments, before accessing data and information in memory, the IOMMU performs a lookup in the private address map for the location of the data and information.

In some embodiments, IOMMU backing store 500 and/or portions thereof (control bits, etc.) are accessed by other entities in electronic device 400 via the IOMMU (e.g., by sending a request to the IOMMU) or are inaccessible by other entities. For example, at least some of the data and information in IOMMU backing store 500 may be accessed by other entities via writes to and reads from corresponding (and protected, by the IOMMU) memory-mapped input-output registers in or associated with the IOMMU.

IOMMU and Guest Operating System Communications

Figure 6:
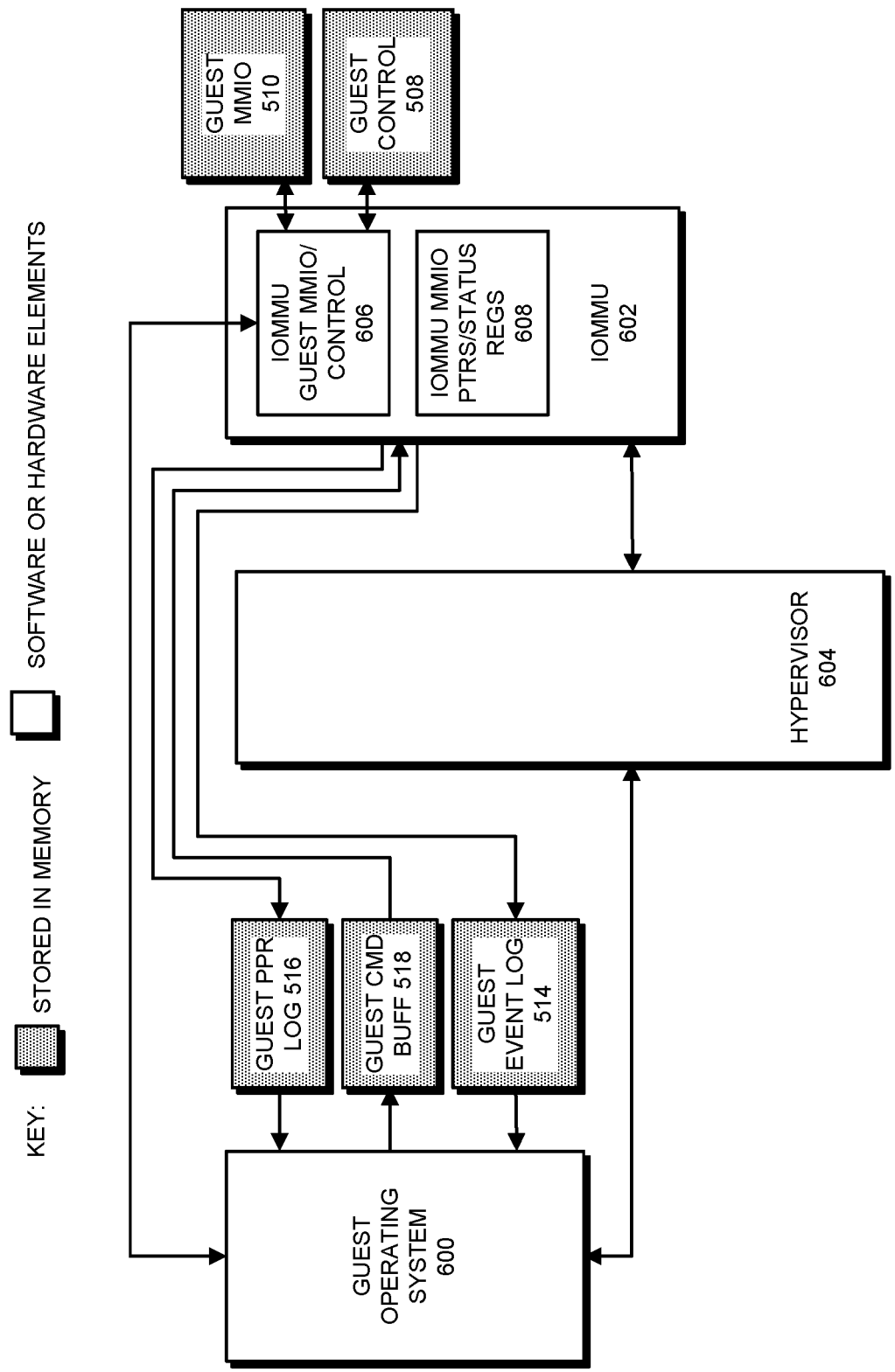
FIG. 6 presents a block diagram illustrating communications between a guest operating system and an IOMMU that are handled by the IOMMU in accordance with some embodiments.

In the described embodiments, an IOMMU (e.g., IOMMU 424) translates or converts domainID and deviceIDs in communications between the IOMMU (or IO devices serviced thereby) and guest operating systems. FIG. 6 presents a block diagram illustrating communications between guest operating system 600 and IOMMU 602 that are handled by IOMMU 602 in accordance with some embodiments. Although a number of elements are shown in a particular arrangement in FIG. 6, other embodiments use different numbers or arrangements of elements. Generally, in the described embodiments, IOMMU 602 includes or accesses sufficient elements to enable the operations herein described. In FIG. 6, a number of elements are shown dotted/stippled; these elements are logs, buffers, etc. that are stored in a memory (e.g., in IOMMU backing store 500, in guest memory 512, etc.) and accessed by IOMMU 602, guest operating system 600, and/or other entities using typical memory access techniques. In some embodiments, guest operating system 600, IOMMU 602, and hypervisor 604 are organized similarly to guest operating system 302, IOMMU 312, and hypervisor 306 in FIG. 3, although this is not a requirement.

Figure 2:
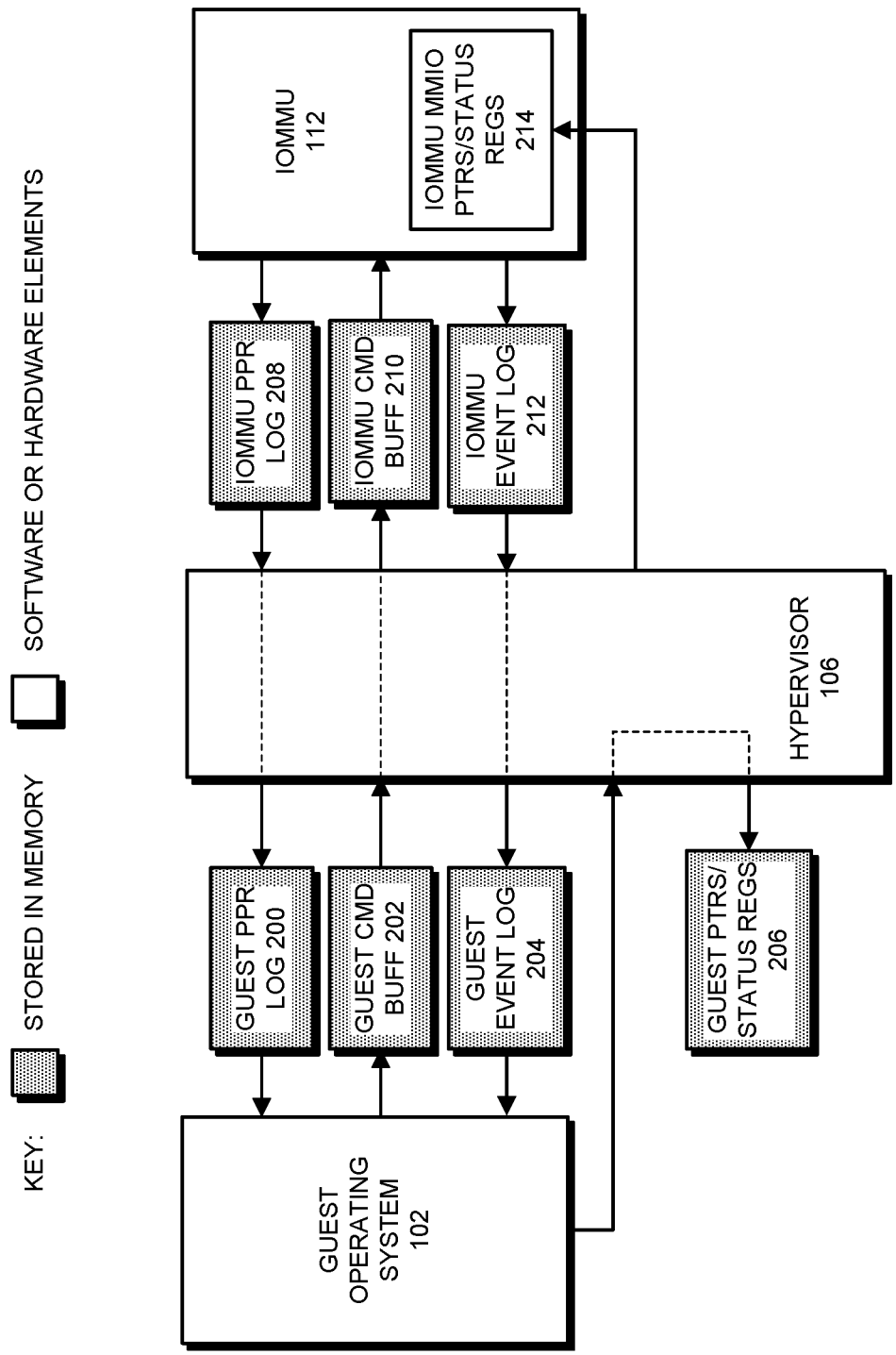
FIG. 2 presents a block diagram illustrating communications between a guest operating system and an IOMMU that are handled by the hypervisor.

As can be seen in FIG. 6, and differently than what is shown in FIG. 2 for existing systems, in the described embodiments, IOMMU 602 and guest operating system 600 communicate more directly with one another. In other words, IOMMU 602 and guest operating system 600 communicate with one another via guest event log 514, guest PPR log 516, and guest command buffer (BUFF) 518 in memory—i.e., in a guest portion of memory (e.g., guest memory 428) for guest operating system 600. In addition, guest operating system 600 and IOMMU 602 use guest control 508 and guest MMIO 510 to dictate how communications are to be performed. For example, in some embodiments, IOMMU 602 uses pointers in guest MMIO 510 to determine the locations in memory of guest event log 514, guest command buffer 518, and guest PPR log 516 for guest operating system 600. Hypervisor 604 does not intervene and is otherwise not involved in some or all of the operations for completing these communications. For example, hypervisor 604 does not perform operations such as translating domainIDs and deviceIDs for these communications, accessing pointers in guest MMIO 510, and/or accessing buffers and logs in the guest portion of the memory. Instead, IOMMU 602 performs these operations. Because IOMMU 602 translates the domainIDs and deviceIDs and acquires information from guest MMIO 510, etc., the described embodiments avoid using hypervisor 604 for processing at least part of communications between guest operating system 600 and IOMMU 602, which can mean that the communications complete more quickly, result in less load on processor 402 and memory 404, etc.

In operation, using a command as an example, guest operating system 600 writes an invalidate_IOMMU_pages command to guest command buffer 518, the command causing IOMMU 602 to invalidate a range of entries in an IOMMU translation cache as specified by a domainID in the command. In other words, the guest operating system performs a memory write in a corresponding guest portion of the memory to update the next open/available entry in guest command buffer 518 to include data (i.e., bits representing the command) for the invalidate_IOMMU_pages command. Guest operating system 600 then sends a write command to the IOMMU to update (e.g., advance, increment, etc.) a command buffer tail pointer in the corresponding IOMMU MMIO register to indicate that guest operating system 600 wrote the command to the command buffer. IOMMU 602 detects guest operating system 600's write of the command buffer tail pointer, e.g., via snooping the write to an address in the corresponding guest command buffer, detecting a change in the value of a buffer tail pointer, receiving the write command from guest operating system 600, etc. Upon detecting the write of the command buffer tail pointer, IOMMU 602 uses the value of the command buffer tail pointer to retrieve the command from the command buffer in the guest portion of the memory. Because guest operating system 600 uses a guest domainID in the command that is likely different than the host domainID that is used by IOMMU 602, if IOMMU 602 were to use the command without first translating the domainID, IOMMU 602 may invalidate an incorrect range of entries. IOMMU 602 therefore determines, using an ID translation table (e.g., ID translation table 502), a host domainID that is associated with the guest domainID in the command. IOMMU next retrieves the command from guest command buffer 518 and replaces the guest domainID in the command by the host domainID. IOMMU 602 then processes the command—causing IOMMU 602 to invalidate the range of entries in its translation cache indicated by the host domainID. IOMMU 602 performs at least some similar operations for IOMMU 602 writes to guest PPR logs 516 and to guest event logs 514—such as replacing host deviceIDs with guest deviceIDs in PPR requests from IO devices or placing guest domainIDs and/or deviceIDs in events.

Although hypervisor 604 is not involved in the translation of the guest domainID to the host domainID, hypervisor 604 and guest operating system 600 and/or IOMMU 602 may separately exchange communications associated with communications between guest operating system 600 and IOMMU 602 or hypervisor 604 may otherwise be involved in ensuring that the communications are properly handled by guest operating system 600 and/or IOMMU 602. For example, hypervisor 604 may directly (via a communication) or indirectly (via snooping memory accesses) determine that guest operating system 600 is making a communication (e.g., writing to a command buffer) and may perform operations such as signaling an interrupt to guest operating system 600 and/or IOMMU 602, updating a shared memory location that functions as a flag, etc.

Processes for Translating DomainIDs and DeviceIDs in an IOMMU

Figure 7:
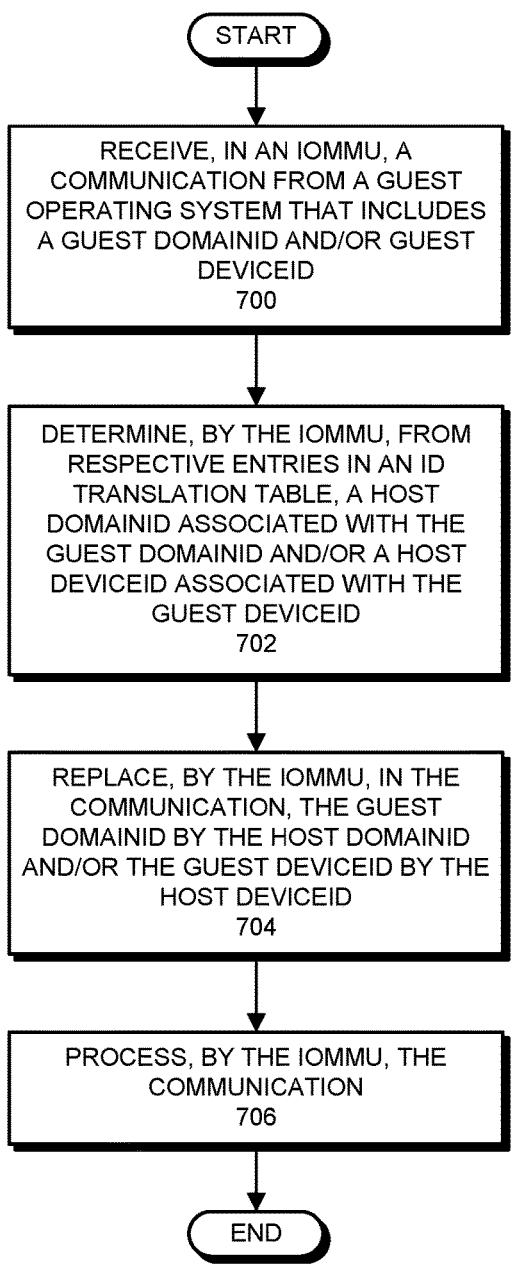
FIG. 7 presents a flowchart illustrating a process for handling, in an IOMMU, a communication from a guest operating system in accordance with some embodiments.

FIG. 7 presents a flowchart illustrating a process for handling a communication from a guest operating system in an IOMMU (e.g., IOMMU 424) in accordance with some embodiments. More specifically, FIG. 7 presents operations for translating a guest domainID and/or deviceID in a communication from a guest operating system to a host domainID and/or deviceID before processing the communication in the IOMMU. Note that the operations shown in FIG. 7 are presented as a general example of operations performed by some embodiments. The operations performed by other embodiments include different operations, operations that are performed in a different order, and/or operations that are performed by different entities or functional blocks.

The operations shown in FIG. 7 apply to any communication received in the IOMMU from a guest operating system that has a guest domainID and/or deviceID. For example, an IOMMU may receive a command in a command buffer (e.g., within guest command buffers 518 in guest memory 512). Generally, the IOMMU can translate guest domainIDs and/or deviceIDs to host domainIDs and/or deviceIDs in various forms of communication from a guest operating system.

The operations in FIG. 7 start when the IOMMU receives, from a guest operating system (e.g., guest operating system 600), a communication that includes a guest domainID and/or guest deviceID (step 700). As described above, and as an effect of virtualization, the guest operating system uses a set of domainIDs and deviceIDs that can be partially or wholly different than a set of domainIDs and deviceIDs used by electronic device (or "host") hardware such as the IOMMU and/or IO devices. (There is a chance that the domainIDs and/or deviceIDs could partially or wholly match, but the chance can be small, particularly in electronic devices that include a larger number of IO devices, virtual devices, domains, etc.) From the perspective of the IOMMU and other electronic device hardware, the communication received from the guest operating system therefore likely includes incorrect domainIDs and/or deviceIDs.

The IOMMU then determines, using respective entries in an ID translation table (e.g., ID translation table 502), a host domainID associated with the guest domainID and/or a host deviceID associated with the guest deviceID (step 702). For example, the IOMMU may use a guest domainID to look up, in the ID translation table, the corresponding host domainID. Note that, in some embodiments, the ID translation table includes separate domainID mapping and deviceID mapping tables (e.g., domainID mapping table 504 and deviceID mapping table 506)—and the lookups are performed accordingly by the IOMMU.

The IOMMU next replaces, in the communication, the guest domainID by the host domainID and/or the guest deviceID by the host deviceID (step 704). For this operation, the IOMMU may change the communication itself, i.e., by writing updated bits to the communication. Alternatively, the IOMMU may write or set internal registers, memory locations, etc. with the value of the host domainID and/or deviceID—thereby presetting or preparing the IOMMU for subsequently processing the communication.

The IOMMU then processes the communication (step 706). For this operation, the IOMMU performs the typical operations associated with processing the particular communications, albeit after replacing the guest domainID and/or deviceID as described for step 704. For example, if the communication is a command, the IOMMU may process the command.

Figure 8:
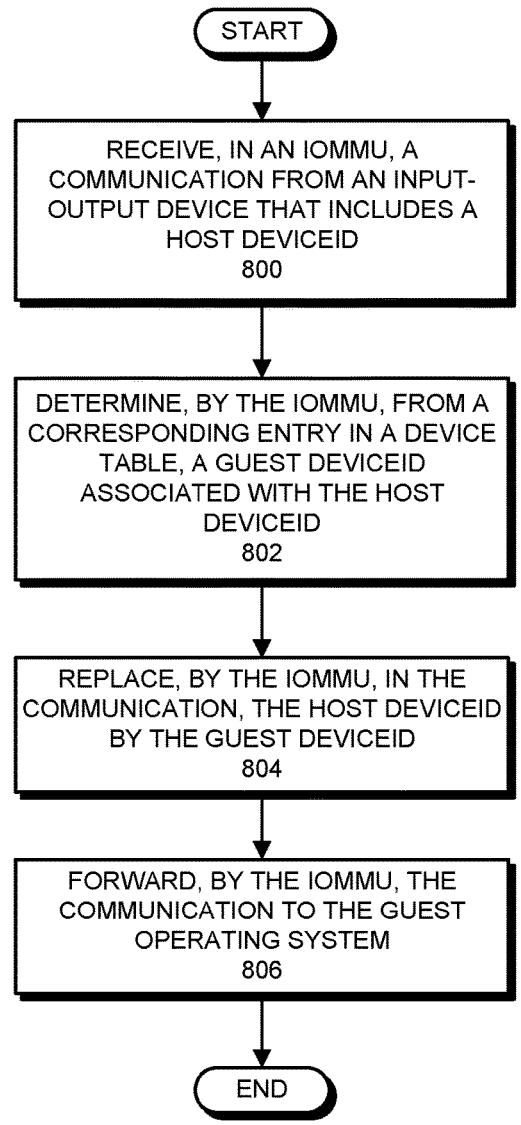
FIG. 8 presents a flowchart illustrating a process for handling, in an IOMMU, a communication from an input-output (IO) device that is destined for a guest operating system in accordance with some embodiments.

FIG. 8 presents a flowchart illustrating a process for handling, in an IOMMU (e.g., IOMMU 424), a communication from an input-output (IO) device that is destined for a guest operating system in accordance with some embodiments. More specifically, FIG. 8 presents operations for translating a host deviceID in a communication from the IO device to a guest deviceID before forwarding the communication to the guest operating system. Note that the operations shown in FIG. 8 are presented as a general example of operations performed by some embodiments. The operations performed by other embodiments include different operations, operations that are performed in a different order, and/or operations that are performed by different entities or functional blocks.

The operations shown in FIG. 8 apply to any communication received in the IOMMU from an IO device that has a host deviceID. For example, the IOMMU may receive a peripheral page request (PPR) from an IO device. Generally, the IOMMU can translate host deviceIDs to guest deviceIDs in various forms of communication from an IO device. In addition, although FIG. 8 is limited to IO devices including host deviceIDs in communications, similar operations can be performed for host domainIDs in communications from IO devices—i.e., for translating host domainIDs to guest domainIDs in such communications.

The operations in FIG. 8 start when the IOMMU receives, from an IO device (e.g., IO device 408), a communication that includes a host deviceID (step 800). As described above, and as an effect of virtualization, the IO device uses a set of deviceIDs that can be partially or wholly different than a set of deviceIDs used by guest operating systems. From the perspective of the guest operating system, communications received from the IO device in the IOMMU therefore likely include incorrect deviceIDs.

The IOMMU then determines, using an entry in a device table (e.g., device table 526), a guest deviceID associated with the host deviceID (step 802). For example, the IOMMU may use a host deviceID to look up, in the device table, the corresponding guest deviceID.

The IOMMU next replaces, in the communication, the host deviceID by the guest deviceID (step 804). For this operation, in some embodiments, the IOMMU changes the communication itself, i.e., by writing updated bits to the communication. Alternatively, in some embodiments, the IOMMU writes or sets internal registers, memory locations, etc. with the value of the guest domainID—thereby indicating, to the guest operating system, the guest deviceID and preparing the guest operating system for processing the communication.

The IOMMU then forwards the communication to the guest operating system (step 806). For this operation, in some embodiments, the IOMMU forwards the communication by storing the communication in a memory location such as a PPR log in the corresponding guest memory. The IOMMU may also signal or indicate to the guest operating system that the communication is ready for processing by the guest operating system. The guest operating system subsequently processes the communication, i.e., performs the typical operations associated with processing the particular communication.

Figure 9:
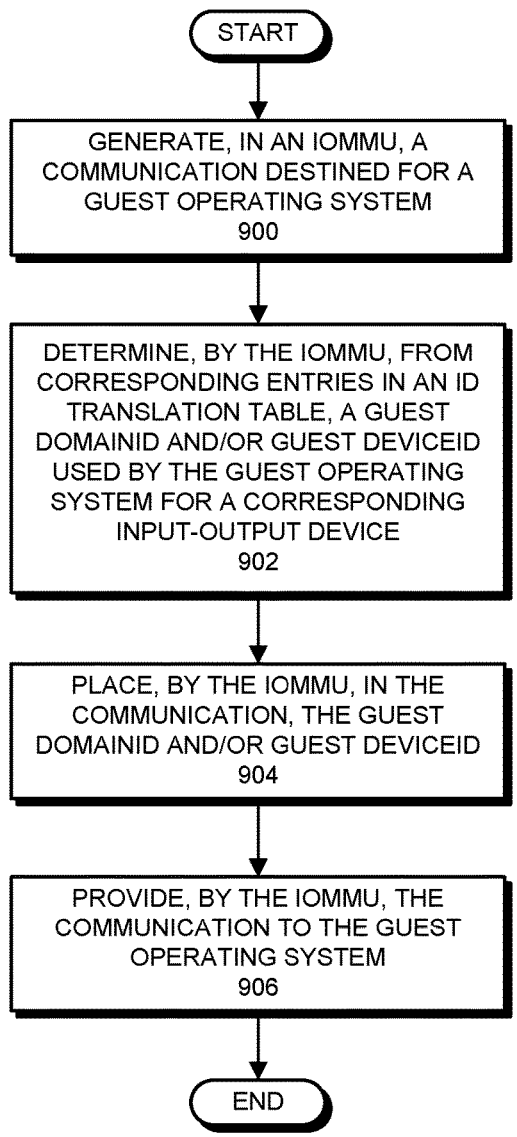
FIG. 9 presents a flowchart illustrating a process for generating, in an IOMMU, a communication destined for a guest operating system in accordance with some embodiments.

FIG. 9 presents a flowchart illustrating a process for generating, in an IOMMU (e.g., IOMMU 424), a communication destined for a guest operating system in accordance with some embodiments. More specifically, FIG. 9 presents operations for including a corresponding guest deviceID and/or domainID in a communication from the IOMMU before sending the communication to the guest operating system. Note that the operations shown in FIG. 9 are presented as a general example of operations performed by some embodiments. The operations performed by other embodiments include different operations, operations that are performed in a different order, and/or operations that are performed by different entities or functional blocks.

The operations shown in FIG. 9 apply to any communication generated by the IOMMU that includes a guest domainID and/or deviceID and is destined for a guest operating system. For example, the IOMMU may, based on the occurrence of an event (e.g., a hardware failure, a page fault, etc.) generate a communication for reporting the event to guest operating systems. Generally, the IOMMU can include guest domainIDs and/or deviceIDs in various forms of communication destined for a guest operating system.

The operations in FIG. 9 start when the IOMMU generates a communication that is destined for a guest operating system (step 900). As described above, and as an effect of virtualization, the IOMMU uses a set of domainIDs and deviceIDs that can be partially or wholly different than a set of domainIDs and deviceIDs used by guest operating systems. From the perspective of the guest operating system, communications generated by the IOMMU using the IOMMU's view of domainIDs and deviceIDs therefore likely include incorrect domainIDs and deviceIDs. When generating the communication, the IOMMU determines, using respective entries in an ID translation table (e.g., ID translation table 502), a guest deviceID and/or domainID that are used by the guest operating system for the corresponding IO device (step 902). For example, the IOMMU uses a host deviceID for the corresponding IO device to look up, in the ID translation table, the corresponding guest domainID and/or deviceID. The IOMMU then places, in the communication, the guest domainID and/or deviceID (step 904). For this operation, in some embodiments, the IOMMU writes corresponding bits to the communication, such as in a field within the communication that hold records of domainID and/or deviceID.

The IOMMU then forwards the communication to the guest operating system (step 906). For this operation, in some embodiments, the IOMMU forwards the communication by storing the communication in a memory location such as an event log in the corresponding guest memory. The IOMMU may also signal or indicate to the guest operating system that the communication is ready for processing by the guest operating system. The guest operating system subsequently processes the communication, i.e., performs the typical operations associated with processing the particular communication.

Process for Configuring an IOMMU for Translating DeviceIDs and DomainIDs

Figure 10:
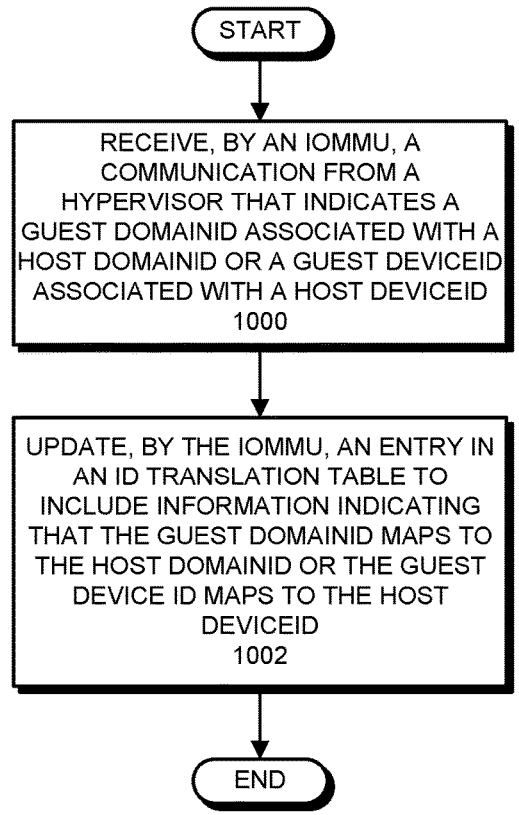
FIG. 10 presents a flowchart illustrating a process for configuring an IOMMU for translating domainIDs and deviceIDs in accordance with some embodiments.

FIG. 10 presents a flowchart illustrating a process for configuring an IOMMU (e.g., IOMMU 424) for translating domainIDs and deviceIDs in accordance with some embodiments. More specifically, FIG. 10 presents operations for setting entries in the ID translation table to indicate mappings between host domainIDs and/or deviceIDs and guest domainIDs and/or deviceIDs. Note that the operations shown in FIG. 10 are presented as a general example of operations performed by some embodiments. The operations performed by other embodiments include different operations, operations that are performed in a different order, and/or operations that are performed by different entities or functional blocks. For example, although the hypervisor is described as performing certain operations in FIG. 10, in alternative embodiments, another entity (e.g., a virtual machine, an electronic device operating system, a guest operating system, a software application, etc.) performs the operations.

The operations in FIG. 10 start when the IOMMU receives, from the hypervisor, a communication that indicates a guest domainID associated with a host domainID or a guest deviceID associated with a host deviceID (step 1000). For example, in some embodiments, the hypervisor writes, to an MMIO location provided by the IOMMU, information about the association between domainIDs or deviceIDs and the IOMMU detects the writing to the MMIO location and/or receives an indication from the hypervisor that the MMIO location was written. The IOMMU then updates an entry in an ID translation table (e.g., ID translation table 502) to include information indicating that the guest domainID maps to the host domainID or the guest deviceID maps to the host deviceID (step 1002).

In some embodiments, the IOMMU receives, and the hypervisor sends, a communication that indicates each guest domainID and/or deviceID recognized by the guest operating system and the corresponding host domainID and/or deviceID. For example, in some embodiments, at startup or at another time, the hypervisor cycles through all of the guest domainIDs and/or deviceIDs recognized by the guest operating system, determines the mapping to host domainIDs and/or device IDs, and communicates information about each domainID or deviceID pairing/mapping.

In some embodiments, an electronic device (e.g., electronic device 400 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), caches/cache controllers, memories/memory controllers, functional blocks, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 400, IOMMU 424, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a processor, the processor executing a guest operating system and a hypervisor;
   an input-output (IO) device; and
   an input-output memory management unit (IOMMU), the IOMMU configured to handle communications between the IOMMU and the guest operating system by:
      replacing, guest domain identifiers (domainIDs) with corresponding host domainIDs and/or guest device identifiers (deviceIDs) with corresponding host deviceIDs in communications received from the guest operating system before further processing the communications received from the guest operating system;
      replacing host deviceIDs with guest deviceIDs in communications received from the IO device before providing the communications received from the IO device to the guest operating system; and
      placing guest domainIDs and/or guest deviceIDs into communications generated in the IOMMU and destined for the guest operating system before providing the communications generated in the IOMMU to the guest operating system.

2. The electronic device of claim 1, wherein the IOMMU is further configured to:
   update an ID translation table for the IOMMU to include information for the guest operating system by:
      receiving, from the hypervisor, a configuration communication indicating that, for the guest operating system, a given guest domainID is associated with a given host domainID or a given guest deviceID is associated with a given host deviceID; and
      updating an entry in the ID translation table to include information indicating that, for the guest operating system, the given guest domainID is associated with the given host domainID or the given guest deviceID is associated with the given host deviceID.

3. The electronic device of claim 2, wherein the IOMMU is further configured to:
   use the ID translation table when replacing the guest domainIDs with corresponding host domainIDs and/or the guest deviceIDs with corresponding host deviceIDs in the communications received from the guest operating system by:
      determining, from respective entries in the ID translation table, host domainIDs for replacing the guest domainIDs and/or host deviceIDs for replacing the guest deviceIDs in the communications received from the guest operating system.

4. The electronic device of claim 2, wherein the IOMMU is further configured to:
   use the ID translation table when placing the guest domainIDs and/or the guest deviceIDs in the communications generated in the IOMMU by:
      determining, from respective entries in the ID translation table, the guest domainIDs and/or the guest deviceIDs used by the guest operating system for IO devices to which the communications generated in the IOMMU relate.

5. The electronic device of claim 2, wherein, for each given domainID and given deviceID used by the guest operating system, the IOMMU receives, from the hypervisor, a corresponding separate configuration communication for updating the ID translation table during a guest operating system initialization operation.

6. The electronic device of claim 2, further comprising:
   a memory separate from the IOMMU;
   wherein, when updating the ID translation table, the IOMMU is further configured to:
      receive the configuration communication from the hypervisor via a memory mapped input-output (MMIO) register in the IOMMU;
      determine, using an IOMMU private address translation table, a location in an IOMMU backing storage area in the memory in which the ID translation table is stored; and
      update the ID translation table in the IOMMU backing storage area.

7. The electronic device of claim 1, wherein the communications received from the guest operating system comprise information written to a command buffer for the IOMMU.

8. The electronic device of claim 1, wherein the hypervisor is configured to:
   determine that, for the guest operating system, a given guest deviceID is associated with a given host deviceID; and
   update a device table to include information for the guest operating system, the updating comprising updating an entry for a corresponding device in the device table to include the given guest deviceID and an identification of the guest operating system.

9. The electronic device of claim 8, wherein the IOMMU is further configured to:
   use the device table when replacing host deviceIDs with guest deviceIDs in communications received from the IO device by:
      determining, from respective entries in the device table, guest deviceIDs for replacing host deviceIDs in the communications received from the IO device.

10. The electronic device of claim 8, wherein, for each deviceID used by the guest operating system, the hypervisor makes a corresponding update to the device table during a guest operating system initialization operation.

11. The electronic device of claim 1, wherein the communications received from the IO device comprise a peripheral page request (PPR) for the guest operating system.

12. The electronic device of claim 1, wherein the IOMMU handles the communications between the IOMMU and the guest operating system without intervention by the hypervisor.

13. A method for handling communications between an input-output memory management unit (IOMMU) and a guest operating system in an electronic device that includes a processor that executes the guest operating system and a hypervisor, an input-output (IO) device, and the IOMMU, the method comprising:
- replacing, by the IOMMU, guest domain identifiers (domainIDs) with corresponding host domainIDs and/or guest device identifiers (deviceIDs) with corresponding host deviceIDs in communications received from the guest operating system before further processing the communications received from the guest operating system;
- replacing, by the IOMMU host deviceIDs with guest deviceIDs in communications received from the IO device before providing the communications received from the IO device to the guest operating system; and
- placing, by the IOMMU, the guest operating system, guest domainIDs and/or guest deviceIDs into communications generated in the IOMMU and destined for the guest operating system before providing the communications generated in the IOMMU to the guest operating system.

14. The method of claim 13, further comprising:
- updating, by the IOMMU, an ID translation table to include information for the guest operating system by:
  - receiving, from the hypervisor, a configuration communication indicating that, for the guest operating system, a given guest domainID is associated with a given host domainID or a given guest deviceID is associated with a given host deviceID; and
  - updating an entry in the ID translation table to include information indicating that the given guest domainID is associated with the given host domainID or the given guest deviceID is associated with the given host deviceID.

15. The method of claim 14, further comprising:
- using, by the IOMMU, the ID translation table when replacing the guest domainIDs with corresponding host domainIDs and/or the guest deviceIDs with corresponding host deviceIDs in the communications received from the guest operating system by:
  - determining, from respective entries in the ID translation table, host domainIDs for replacing the guest domainIDs and/or host deviceIDs for replacing the guest deviceIDs in the communications received from the guest operating system.

16. The method of claim 14, further comprising:
- using, by the IOMMU, the ID translation table when placing the guest domainIDs and/or the guest deviceIDs in the communications generated in the IOMMU by:
  - determining, from respective entries in the ID translation table, the guest domainIDs and/or the guest deviceIDs used by the guest operating system for IO devices to which the communications generated in the IOMMU relate.

17. The method of claim 14, further comprising:
- receiving, by the IOMMU, for each given domainID and given deviceID used by the guest operating system, from the hypervisor, a corresponding separate configuration communication for updating the ID translation table during a guest operating system initialization operation.

18. The method of claim 14, wherein the electronic device further comprises a memory separate from the IOMMU, and wherein the method further comprises, when updating the ID translation table:
- receiving, by the IOMMU, the configuration communication from the hypervisor via a memory mapped input-output (MMIO) register in the IOMMU;
- determining, by the IOMMU, using an IOMMU private address translation table, a location in an IOMMU backing storage area in the memory in which the ID translation table is stored; and
- updating, by the IOMMU, the ID translation table in the IOMMU backing storage area.

19. The method of claim 13, wherein the communications received from the guest operating system comprise information written to a command buffer for the IOMMU.

20. The method of claim 13, further comprising:
- determining, by the hypervisor, that, for the guest operating system, a given guest deviceID is associated with a given host deviceID; and
- updating, by the hypervisor, a device table to include information for the guest operating system, the updating comprising updating an entry for a corresponding device in the device table to include the given guest deviceID and an identification of the guest operating system.

21. The method of claim 20, further comprising:
- using, by the IOMMU, the device table when replacing host deviceIDs with guest deviceIDs in communications received from the IO device by:
  - determining, from respective entries in the device table, guest deviceIDs for replacing host deviceIDs in the communications received from the IO device.

22. The method of claim 20, further comprising:
- for given deviceID used by the guest operating system, making, by the hypervisor, a corresponding update to the device table during a guest operating system initialization operation.

23. The method of claim 13, wherein the communications received from the IO device comprise a peripheral page request (PPR) for the guest operating system.

24. The method of claim 13, wherein the IOMMU handles the communications between the IOMMU and the guest operating system without intervention by the hypervisor.

* * * * *